(12) United States Patent
Tognetti et al.

(10) Patent No.: US 8,123,149 B2
(45) Date of Patent: *Feb. 28, 2012

(54) CHEMICAL MIXING STATION

(75) Inventors: David L. Tognetti, Howell, MI (US); Mark D. Morin, Plymouth, MI (US)

(73) Assignee: Belanger, Inc., Northville, MI (US)

( * ) Notice: Subject to any disclaimer, the term of this patent is extended or adjusted under 35 U.S.C. 154(b) by 875 days.

This patent is subject to a terminal disclaimer.

(21) Appl. No.: 11/687,858

(22) Filed: Mar. 19, 2007

(65) Prior Publication Data

US 2008/0230539 A1   Sep. 25, 2008

(51) Int. Cl.
*A62C 5/02* (2006.01)
*B08B 3/00* (2006.01)
(52) U.S. Cl. ............... 239/310; 134/94.1; 134/99.2
(58) Field of Classification Search ............ 220/477, 220/476, 480, 481, 483, 23.8; 222/129.1, 222/132, 134, 135, 136, 142.3, 142.5, 145.1, 222/180, 575; 215/383, 385; 134/94.1, 99.2, 134/100.1; 239/310; 210/205
See application file for complete search history.

(56) References Cited

U.S. PATENT DOCUMENTS

| | | | | |
|---|---|---|---|---|
| 3,225,951 | A | * | 12/1965 | Poston et al. .................. 215/6 |
| 3,723,851 | A | * | 3/1973 | Johnson et al. ............. 222/132 |
| 3,811,671 | A | * | 5/1974 | Turnbull ....................... 482/13 |
| 3,917,172 | A | * | 11/1975 | O'Hare ...................... 239/305 |
| 4,454,944 | A | * | 6/1984 | Shillington et al. ......... 206/366 |
| 4,673,087 | A | * | 6/1987 | Webb .......................... 206/600 |
| 4,782,945 | A | * | 11/1988 | Geiler et al. ................. 206/203 |
| 5,131,568 | A | * | 7/1992 | Ringuette .................... 222/143 |
| 5,632,118 | A | * | 5/1997 | Stark ............................. 49/181 |
| 6,182,555 | B1 | * | 2/2001 | Scheer et al. .................. 99/290 |
| 7,320,438 | B1 | * | 1/2008 | Latin et al. .................. 239/310 |
| 2004/0094555 | A1 | * | 5/2004 | Raches et al. ............... 220/476 |
| 2006/0021996 | A1 | * | 2/2006 | Scott et al. ................ 222/145.5 |
| 2007/0012693 | A1 | * | 1/2007 | Kummer ..................... 220/4.27 |
| 2008/0006601 | A1 | * | 1/2008 | Stoddard ..................... 215/383 |

OTHER PUBLICATIONS

Photograph A is a photograph of prior art chemical dispensing systems used in commercial car washes.
Photograph B is a photograph of prior art chemical dispensing systems used in commercial car washes.

* cited by examiner

*Primary Examiner* — Bryon Gehman
*Assistant Examiner* — Shawn Braden
(74) *Attorney, Agent, or Firm* — Young Basile Hanlon & MacFarlane PC

(57) ABSTRACT

A molded plastic mixing station housing for mixing water and chemical for car wash applications comprises a generally right hexahedron having a deep top recess which visually divides the housing into parallel spaced apart towers. A cylindrical mixing reservoir is recessed into the front of the housing such that a Hyrominder can be mounted in the top recess to overlie the open top of the mixing reservoir. A stand-off welt wraps around the entire housing just below the vertical center line to provide a stand-off feature for both wall mounting as well as the mounting of a control panel on one of the side surfaces of the housing. Mounting bracket slots are provided in the four upper corners of the housing for both wall mounting and control panel mounting. A deep recess runs down the back side to provide space for an overflow tube. The housing is preferably rotocast from high density polyethylene and may be color coded to match with the supply for a particular chemical.

9 Claims, 3 Drawing Sheets

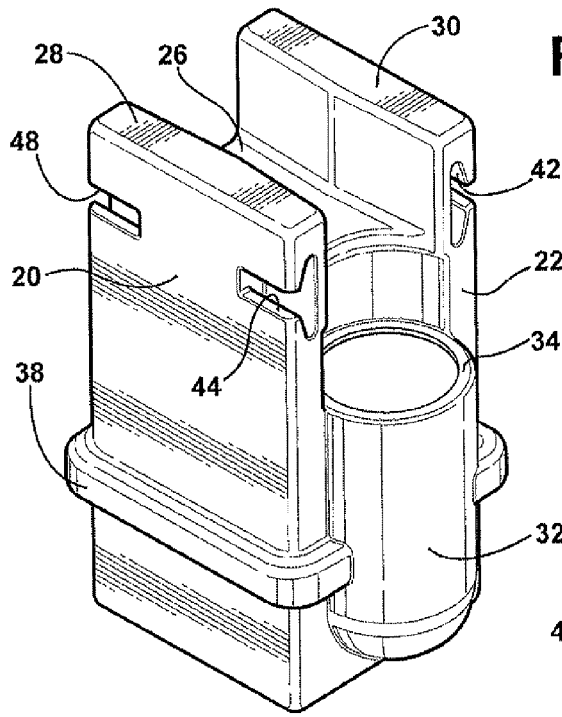
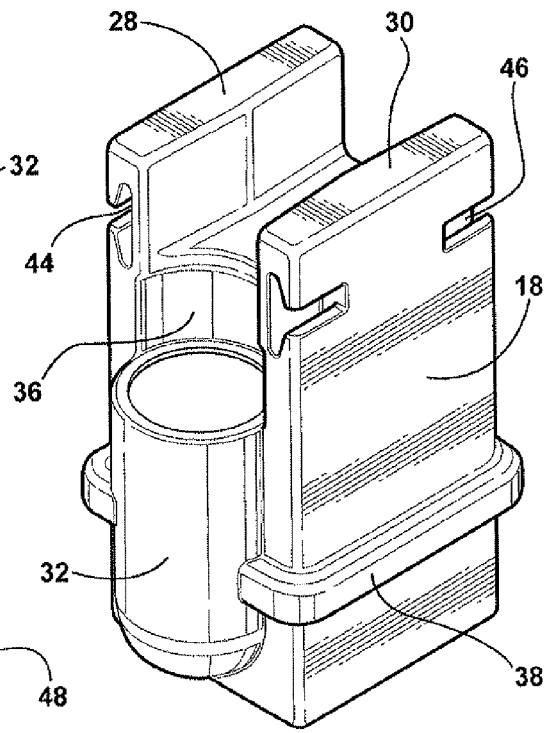
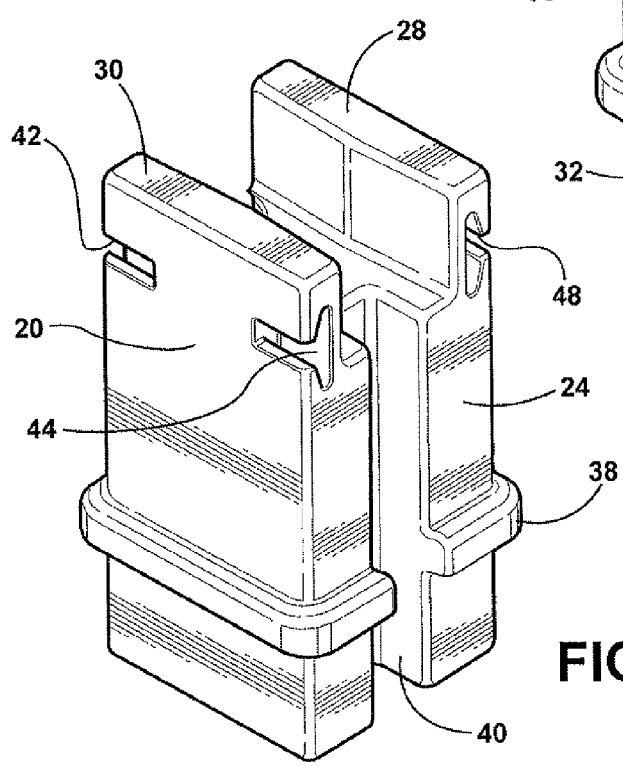
FIG - 2
FIG - 3
FIG - 4

CHEMICAL MIXING STATION

FIELD OF THE INVENTION

This invention relates to vehicle laundry facilities, commonly called "carwashes" and more particularly to a wall-mountable chemical mixing station where a mix of water and a carwashing chemical is continuously prepared for use in washing vehicles.

BACKGROUND OF THE INVENTION

Most vehicle laundries, commonly called "carwashes" include systems for mixing one or more chemicals into the wash and/or rinse water before it is applied to the vehicle. By way of simple example, a surfactant such as soap is typically added to the wash water and an anti-spotting chemical is typically added to the rinse water. Other chemicals are used for wheel washing, tire brightening and corrosion inhibiting. These chemical additions are achieved by way of mixing stations including small tanks or reservoirs where water is maintained at a certain level and a chemical is siphoned into the reservoir as water is added. Therefore, a sufficient quantity of mixed water/chemical is available during the entirety of a carwashing operation.

Other than the fact that the mixing stations are typically mounted on walls or boards which serve as proxies for walls, there is little in the way of organized structures for mounting the mixing stations or for keeping track of which particular chemical is associated with any given mixing station.

SUMMARY OF THE INVENTION

The present invention provides a molded plastic housing particularly suitable for use as a wall-mountable mixing station in a carwash facility. In accordance with the invention, the mixing station housing is preferably molded of a suitable durable plastic such as high-density polyethylene in the general shape of a six-sided right polyhedron so as to exhibit top, bottom, front, rear and opposite planar parallel side surfaces. The housing is visually bifurcated through a vertical centerplane in part by a recess formed in the top surface and extending between the front and back surfaces so as to provide a place for mounting a water level control device such as a Hydrominder. A mixing reservoir is integrally molded into the front surface of the housing between the parallel side surfaces and is preferably partially recessed into the front surface so as to underlie the Hydrominder outlet which introduces water and chemical into the reservoir as needed. Mounting apertures are provided such as by molding in the housing in complemental pairs at the top corners of the side surfaces. These apertures can serve two purposes; i.e., on one side they may permit the device to be mounted on a wall, and on the other side they may permit a control panel to be mounted over one of the parallel side surfaces.

In the preferred form hereinafter described in detail, a welt which wraps around the housing and is integrated into the cylindrical reservoir acts as a stand-off for the housing itself when it is wall-mounted by means of one of the upper located complemental pairs of mounting apertures and as a stand-off for a panel which may be mounted to the opposite parallel plane surface by way of the mounting apertures in that surface.

In the preferred form, the housing is symmetrical about a center plane so that it may be mounted in any of a variety of orientations; e.g., with the reservoir in front, with the reservoir on the left, or with the reservoir on the right. A recess running down the rear surface provides a convenient place for an overflow conduit or hose.

The various features and advantages of the invention will be best understood by reference to the following description of a preferred or illustrative embodiment thereof in which the housing plastic is pigmented in a particular color so that a set or series of mixing stations can be mounted adjacent one another, each being color coded to a specific chemical to remind the operator exactly how to connect up a chemical supply tank to a particular mixing station.

BRIEF DESCRIPTION OF THE DRAWING

FIG. 2 is another perspective view of the housing portion of the mixing station of FIG. 1 from a first angle;

FIG. 3 is another perspective view of the housing portion of the mixing station of FIG. 1 from another angle;

FIG. 4 is a perspective view of the housing portion of the mixing station of FIG. 1 from a third angle.

DETAILED DESCRIPTION OF THE ILLUSTRATIVE EMBODIMENT

Figure 1:
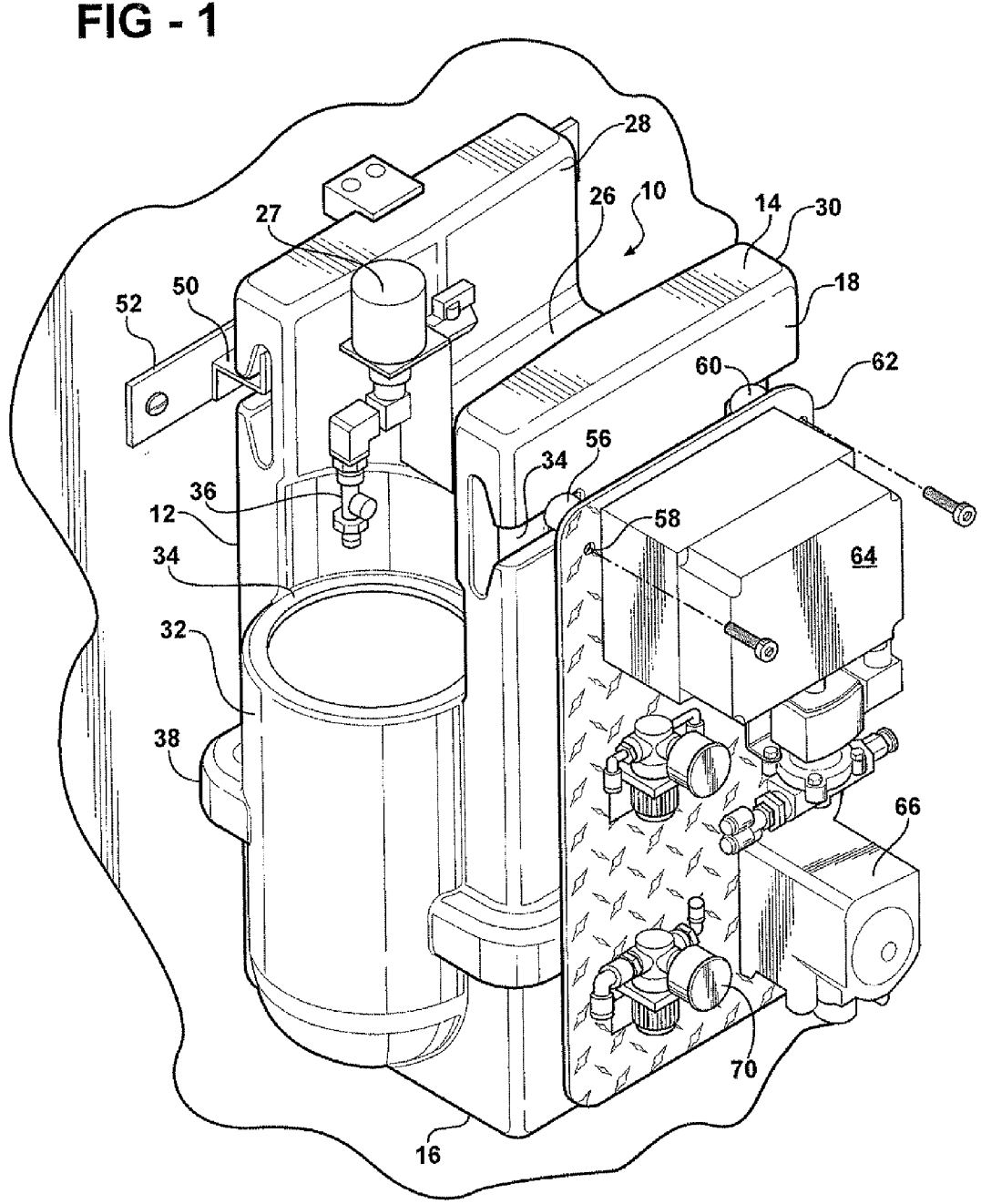
FIG. 1 is a perspective view of a wall-mountable chemical mixing station in accordance with the invention and with various accessories including a control panel mounted thereon.

FIG. 1 shows in perspective a wall-mountable chemical mixing station 10 constructed in accordance with the present invention and including a molded plastic housing 12, the various contours and configurations of which are best shown in FIGS. 2-4. The housing 12 is generally in the shape of a right hexahedron; i.e. a six-sided figure, the planes of which are all generally rectangular. The housing 12 comprises a bifurcate top surface 14, a flat unitary bottom surface 16, opposite planar side surfaces 18 and 20, a partially bifurcated front surface 22 and a fully bifurcated rear surface 24. A deep depression or recess 26 is molded into the bifurcated top surface 14 and extends fully between the opposite side surfaces 18 and 20 to provide a mounting location for an automatic level maintaining mixer accessory known in the trade as a Hydrominder. The recess 26 also provides a convenient space for the mounting or disposition of a water supply line.

The recess 26 in the bifurcated top surface 14 divides the housing visually into two substantially rectangular parallel towers 28 and 30. A cylindrical mixing reservoir 32 is integrally molded into the front surface 22. The reservoir 22 has an open top surface 34 and is bounded on the upper side by a semi-cylindrical recess surface 36 which extends between the towers 28 and 30 as best shown in FIG. 3. As such, the depending outlet of the Hydrominder 27 overlies the open top 34 of the reservoir 32 so as to admit a mixture of water and chemical into the reservoir as necessary to maintain a predetermined supply during car wash operation.

A wrap-around welt 38 in the form of an integral plastic ridge extends all the way around the housing 12, being bifurcated or terminated on the rear surface 24 by virtue of the vertical recess 40 which extends fully between the bottom surface (not shown) and the fore and aft running recess 26 to provide a convenient location for an overflow hose or pipe. The welt 38 serves as a standoff for both wall mounting of the housing 12 and for the purpose of assisting in the mounting of panel such as that shown as 62 in FIG. 1.

Slotted apertures 42, 44, 46 and 48 are formed in complemental pairs at the upper corners of the housing 12 as best shown in FIGS. 1-4. The slotted apertures 44 and 48, by way of example, provide a location where slide-in hangars 50 mounted on or attachable to a wall-mounted bracket 52 can be located. When mounted as shown in FIGS. 1 and 5, the standoff welt 38 contacts the wall on which the bracket 52 is mounted to maintain proper spacing between the wall and the housing 12 whereby the housing is in a perfect upright orientation.

As shown in FIG. 1, on the opposite side surface, the other complemental pair of apertures 42 and 46 provide a location for slide in plates 54 which have threaded apertures (not shown) to receive bolts which extend through holes 58 in a front-mounted plate 62 as well as through spacers 56 and 60 and into the threaded holes in the plates 54 to secure the panel plate 62 in position. Note that the longer length plate 62 shown in FIG. 1 lies against the front stand-off welt 38 to maintain a spacing of about ¾ of an inch between the back of the plate 62 and the side surface of the housing 12. The plate 62 is shown by way of example to carry a timer 64, a pump 66 and additional fluid control accessories 68 and 70 having control valves and connectors mounted therein.

FIG. 2 shows the housing 12 from the front and left side whereas FIG. 3 shows the housing from the front and right side. It will be noted that the housing is symmetrical about a plane drawn diametrically through the reservoir 22 and along the center line of the top recess 26. FIG. 4 shows the housing 12 from the right side and rear with the vertical recess 40 for an overflow pipe clearly in evidence.

Figure 5:
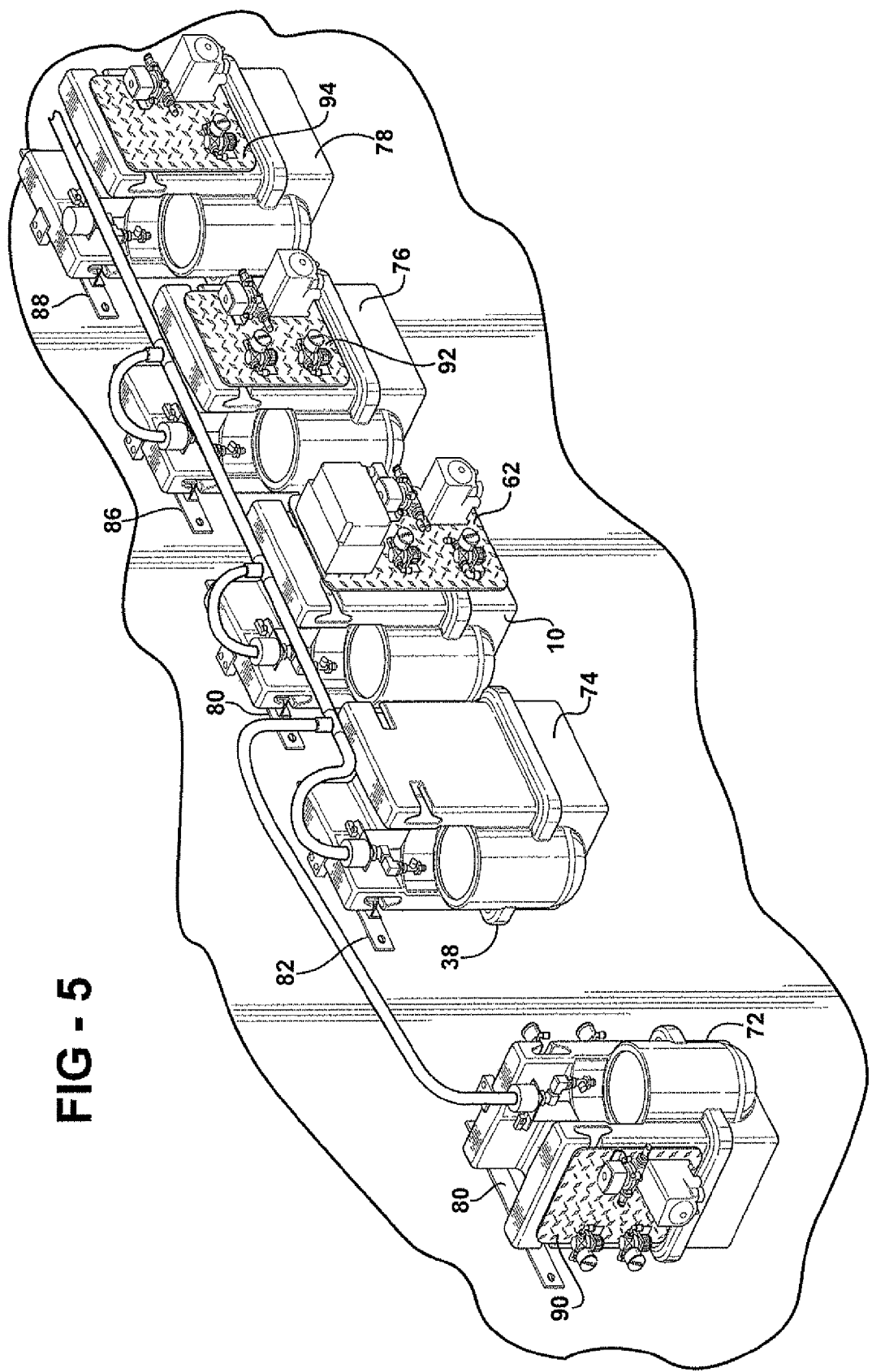
FIG. 5 is an illustration of how a plurality of color coded mixing stations may be variously mounted in a car wash installation for coordination with the various chemicals used in a particular car wash.

Referring now to FIG. 5, a typical installation is shown to comprise the mixing station 10 mounted in the center of a group of five mixing centers 72, 74, 10, 76 and 78. The housings of the mixing centers are preferably color coded so that all have a distinctive visual appearance. For example, the color of the housing for mixing station 72 is orange, the color for the mixing station 74 is yellow, the color for the mixing station 10 is blue, the color for the mixing station 76 is green and the color for the mixing station 78 is red. These colors are preferably mixed in with the high-density polyethylene material from which the particular mixing chamber housing is rotocast. It is a simple matter to apply color-coded labels to all of the barrels or drums of chemical kept in a car wash storage facility which label colors correspond to those of the mixing stations. Correct connections are made by matching the colored label on the supply to the color of the particular mixing station to which it belongs. This color coding is effective in overcoming language difficulties as well as reminding even the most astute operator exactly which chemical goes which with station.

FIG. 5 also illustrates the fact that the mixing stations can be mounted in different orientations. The mixing station 72 is mounted with its integral reservoir in the front whereas the mixing stations 74, 10, 76 and 78 are all mounted with the reservoirs on the left side. FIG. 5 also illustrates the fact that various configurations and sizes of panels can be used in connection with the various mixing stations. Mixing station 10 has, consistent with FIG. 1, a full length panel 62 whereas mixing stations 76 and 78 have short panels carrying fewer components. The wall brackets 80, 82, 86 and 88 all allow the mixing stations to be wall mounted in the manner previously described with reference to FIG. 1.

What is claimed is:

1. A wall mountable chemical mixing station for carwashes comprising:
   a molded plastic housing having a general shape of a right hexahedron with a top surface, a bottom surface, opposite planar parallel side surfaces, a front surface and a rear surface;
   a recess formed in the top surface and extending between the front and back surfaces so as to visually separate the top portion of the housing into two parallel upstanding towers;
   a generally cylindrical, open top mixing reservoir integrally molded into the front surface between the side surfaces;
   mounting apertures molded into said housing in complemental pairs at the top corners of said side surfaces; and
   a molded-in wraparound welt which extends outwardly from each of said front rear and opposite planar parallel side surfaces and is integral with said reservoir.

2. The wall-mountable mixing station defined in claim 1 wherein said plastic is high-density polyethylene.

3. The wall-mountable chemical mixing station defined in claim 1 further including a vertical recess formed in said rear surface and extending fully between said bottom and said recess formed in said top surface.

4. Wall-mountable chemical mixing station as defined in claim 1 herein said apertures take a form of slots opening to said front and rear surfaces and extending into said opposite planar parallel side surfaces to receive fastener assemblies.

5. The wall-mountable chemical mixing station defined in claim 4 further including fastener assemblies for at least two of said slots wherein said fastener assemblies comprise rigid plates which slide into said slots from the side openings thereof and have threaded holes formed therein to receive threaded fasteners.

6. The wall-mountable chemical mixing station defined in claim 1 wherein said mixing reservoir is recessed into said front surface, said front surface above said reservoir and between said towers having a semi-cylindrical concave shape which follows the contour of said reservoir.

7. A wall-mountable chemical mixing station as defined in claim 1 further including a control panel secured to one of said side surfaces by means of said apertures.

8. A wall-mountable chemical mixing station as defined in claim 1 further including a control panel attached to one of said opposite planar parallel side surfaces by means of said apertures and having a rear surface which bears against said welt so as to stand off of said parallel side surface.

9. A wall-mountable chemical mixing station as defined in claim 1 wherein said housing is distinctively colored so as to color-codeable to a chemical to be mixed with water in said reservoir.

\* \* \* \* \*